C. L. BETTS.
ACETYLENE GAS GENERATOR.
APPLICATION FILED DEC. 14, 1904.
Patented Dec. 22, 1908.
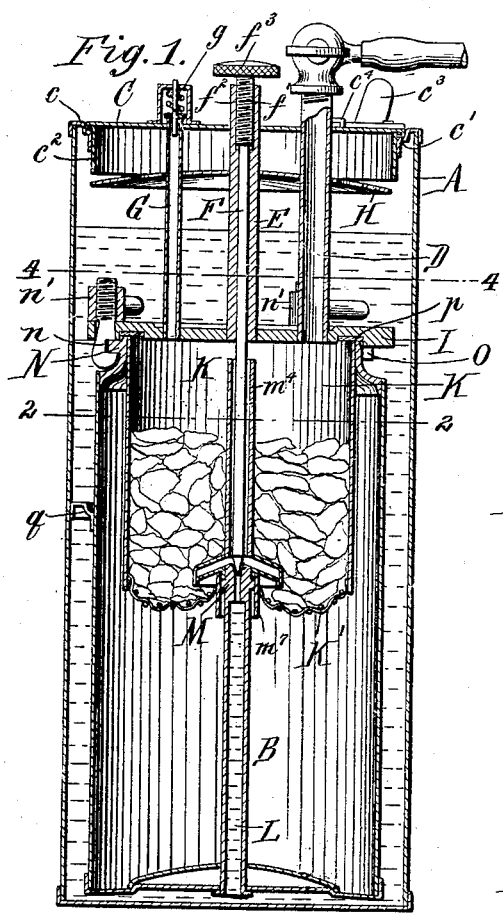
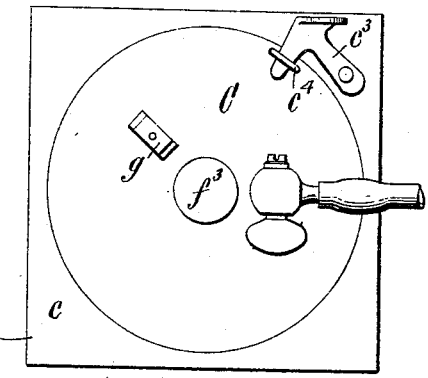
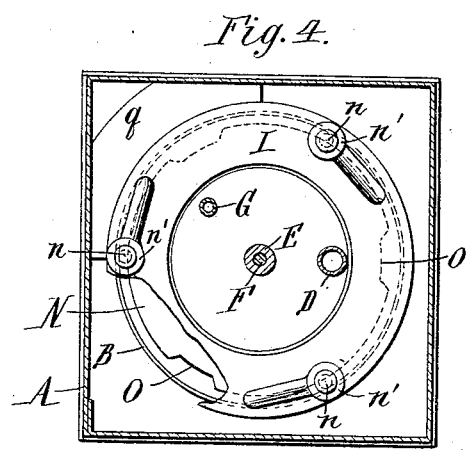
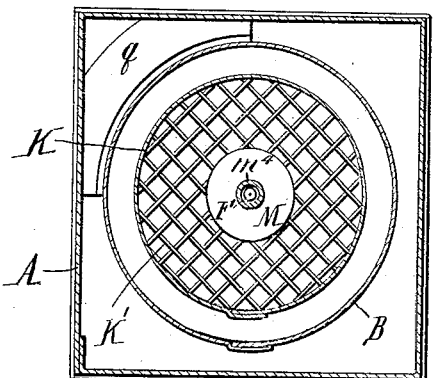
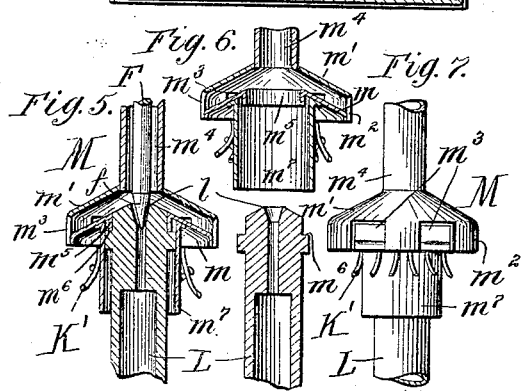
Witnesses:
Inventor
C. L. Betts
by Wilhelm Parker & Hart
Attorneys

UNITED STATES PATENT OFFICE.

CHARLES L. BETTS, OF NEW YORK, N. Y., ASSIGNOR TO R. E. DIETZ COMPANY, OF NEW YORK, N. Y.

ACETYLENE-GAS GENERATOR.

No. 907,446.　　　　Specification of Letters Patent.　　　　Patented Dec. 22, 1908.

Application filed December 14, 1904. Serial No. 236,817.

*To all whom it may concern:*

Be it known that I, CHARLES L. BETTS, a citizen of the United States, residing at New York, borough of Brooklyn, in the county of Kings and State of New York, have invented a new and useful Improvement in Acetylene-Generators, of which the following is a specification.

This invention relates to that class of acetylene generators in which the generating vessel is arranged within a water tank or vessel and provided with an ascending water supply pipe which receives the water at its lower end from the tank and delivers the water from its upper end upon the calcium carbid in the generating vessel.

The invention has for its object to produce a generator of this general character which is simple in construction and efficient in operation, and which can be conveniently taken apart for supplying the carbid to the generating vessel and removing the residue therefrom.

In the accompanying drawings: Figure 1 is a sectional elevation of an acetylene generator provided with my improvements. Fig. 2 is a horizontal section in line 2—2, Fig. 1. Fig. 3 is a top plan view of the generator. Fig. 4 is a horizontal section in line 4—4, Fig. 1. Fig. 5 is a fragmentary vertical section, on an enlarged scale, of the water supply valve and distributing head. Fig. 6 is a similar sectional view showing the distributing head raised from the water supply pipe. Fig. 7 is a side elevation of the distributing head.

Like letters of reference refer to like parts in the several figures.

A represents the tank or outer vessel suitable for holding water, and B the generating vessel which is arranged within the water tank or vessel. Each of these vessels may have any suitable form, for instance, the outer vessel may be square and the generating vessel round, as shown in the drawings. The generating vessel is arranged within the lower portion of the outer vessel or tank so that it is submerged by the water with which the outer vessel or tank is supplied.

The outer vessel is provided in its top plate $c$ with an opening through which the generating vessel is inserted and removed and which is closed by a cover C resting upon a shoulder $c'$ formed around the opening, which is shown of round form. The cover C is preferably provided with a cylindrical hoop or collar $c^2$ which fits snugly into the opening of the top plate. The cover C is secured to the outer vessel by any suitable detachable fastening, for instance, a hook $c^3$ pivoted to the outer vessel and engaging in a loop $c^4$ on the cover.

The generating vessel is permanently connected with the cover C by the gas pipe D, the sleeve E containing the valve stem F, and the gas pipe G which leads to the safety valve $g$. A splash plate H is preferably secured to the pipes D, G, and the sleeve E immediately below the collar of the cover C. The top of the generating vessel B is closed by a detachable cover I to which the lower ends of the gas pipes D, G, and the sleeve E are secured and which is tightly clamped to the top of the generating vessel. The latter is so much lower than the outer vessel that a water space of suitable size is formed above the cover of the generating vessel.

K represents the carbid receptacle which is arranged in the upper portion of the generating vessel and provided with an open, reticulated or perforated bottom or grate K' on which the carbid rests and through which the residue drops into the lower portion of the generating vessel.

L represents the water supply pipe which is secured centrally in the bottom of the generating vessel and extends upwardly therefrom to a point above the bottom of the carbid receptacle, so that the water flows from the space between the generating vessel and the outer vessel upwardly through this pipe and is delivered from the upper end thereof into the lower portion of the carbid receptacle, where it comes in contact with the lower portion of the mass of carbid therein. The water supply pipe is provided at its upper end with a valve seat $l$ adapted to receive the tapering valve $f$ formed at the lower end of the valve stem F. The latter is provided near its upper end with a screw thread $f''$ which engages in a thread $f^2$ in the sleeve E for adjusting the valve toward and from its seat by turning the stem by the knob $f^3$ at the upper end of the stem.

M represents a distributing head which surrounds the upper or delivery end of the water supply pipe in the carbid receptacle and which distributes the water issuing from the pipe around the same and also keeps the carbid away from the outlet of the pipe and the valve, so that the valve is not liable to become clogged. This distributing head is secured centrally in the open bottom of the carbid receptacle and consists of a lower cone $m$ which surrounds the upper conical end of the pipe L in which the valve seat is formed, an upper cone $m'$ which is secured to the lower cone and held at a short distance above the same by its skirt or marginal flange $m^2$ in which the water outlets $m^3$ are formed, and a protecting sleeve or pipe $m^4$ which extends upwardly from the upper cone $m'$ nearly to the top of the carbid receptacle and incloses the valve stem $l'$. The lower cone $m$ is provided with a downwardly extending short inner sleeve $m^5$ which rests upon a narrow flange $m^6$ surrounding the pipe L, and with a lower outer sleeve $m^7$ which fits snugly around the flange $m^6$. The distributing head L is permanently secured in the bottom of the carbid receptacle by soldering, or otherwise, and supports the receptacle removably on the pipe.

The cover I of the generating vessel is tightly secured to the latter by attaching means which can be readily released when access is required to the interior of the same for discharging the residue and refilling the carbid receptacle. The preferred attaching means is constructed as follows:

The upper end of the generating vessel is provided with an external flange N which is engaged by hook bolts $n$ arranged in the marginal portion of the cover I and extending with their upper screw-threaded portions above the latter. These bolts are tightened by hand nuts $n'$ applied to the bolts above the cover I. In order to permit of the ready removal of the cover upon simply loosening the hook bolts the flange N of the generating vessel is provided with notches O corresponding in number with the number and position of the bolts, so that when the hooked heads of the bolts are in register with these notches the cover I can be placed on the top flange of the generating vessel or can be removed therefrom, while by giving the cover a partial turn after applying it to the top flange the hook bolts are engaged beneath the same. By then tightening the bolts the cover is tightly clamped to the vessel. A packing ring $p$ is preferably arranged in the under side of the cover above the flange N.

Upon releasing the fastening of the top cover C this cover and the generating vessel attached thereto can be readily removed from the outer vessel. By then loosening the hand nuts of the cover I of the generating vessel and giving this cover a partial turn to place the hook bolts in register with the notches of the flange, the cover I can be removed from the generating vessel. The carbid receptacle can now be removed from the generating vessel, leaving in the latter only the water supply pipe. The residue, which is comparatively dry, can now be removed from the generating vessel. A new charge of carbid can now be supplied to the carbid receptacle and the apparatus be assembled for use in a very simple and convenient manner.

In the operation of this apparatus the water passes from the upper end of the water supply pipe into the lower portion of the carbid receptacle, leaving the main portion of the carbid, which lies above the distributing head, practically dry and unaffected. The lime or residue which is formed by the decomposition of the carbid drops as fast as it is formed through the open bottom of the receptacle into the generating vessel below. The outer vessel is preferably provided on its inner side with one or more segmental corner pieces $q$ by which the generator vessel is steadied laterally.

I claim as my invention:

1. The combination of an outer water supply vessel, a generating vessel arranged therein, a carbid receptacle arranged in the upper portion of the generating vessel and having an open bottom for supporting the carbid and allowing the escape of the residue, an ascending water supply pipe extending from the bottom of the generating vessel upwardly through the open bottom of the carbid receptacle, a distributing head arranged on said pipe above said open bottom and adjacent thereto, a regulating valve arranged in said distributing head, and a stem extending from said valve upwardly through the cover of said generating vessel, substantially as set forth.

2. The combination of an outer water supply vessel, a generating vessel arranged therein, a carbid receptacle arranged in the upper portion of the generating vessel and having an open bottom for supporting the carbid and allowing the escape of the residue, an ascending water supply pipe extending from the bottom of the generating vessel upwardly through the open bottom of the carbid receptacle, a distributing head arranged on said pipe above said open bottom and adjacent thereto, a regulating valve arranged in said distributing head, a stem extending from said valve upwardly through the cover of said generating vessel, and a protecting sleeve surrounding said valve stem above said distributing head, substantially as set forth.

3. The combination of an outer water supply vessel having a removable cover, a generating vessel arranged in said vessel and having a removable cover, a carbid receptacle arranged in the upper portion of the generating vessel and having an open bottom for supporting the carbid and allowing the escape of the residue, an ascending water supply pipe extending from the bottom of the generating vessel upwardly through the open bottom of the carbid receptacle, a distributing head arranged on said pipe above said bottom and adjacent thereto, a regulating valve arranged in said head, and a stem extending from said valve upwardly through the covers of the generating vessel and the water supply vessel, substantially as set forth.

4. The combination of a generating vessel, a carbid receptacle, an ascending water supply pipe penetrating the bottom of said receptacle, a distributing head surrounding the upper end of said pipe above the bottom of said receptacle and comprising a lower cone and an upper cone, a protecting sleeve rising from the upper cone and water outlets at the bases of said cones, and a regulating valve arranged at the outlet of said pipe and having its stem arranged in said sleeve, substantially as set forth.

5. The combination of a generating vessel provided with a removable cover, a carbid receptacle removably arranged in the upper portion of said vessel and having an open bottom, an ascending water supply pipe affixed to said vessel and extending with its upper portion through the bottom of said receptacle, and a distributing head affixed to the bottom of said receptacle and removably surrounding the upper end of said water pipe, substantially as set forth.

6. The combination of an outer water vessel having a removable cover, an inner generating vessel having a removable cover which is arranged below the cover of the outer vessel, a sleeve secured at its upper and lower ends to said covers, a carbid receptacle arranged in the upper portion of said generating vessel, a water supply pipe extending upwardly from the bottom of the generating vessel and through the bottom of the carbid receptacle, and a regulating valve arranged in the outlet of said pipe and having its stem extending upwardly through the cover of the generating vessel, said connecting sleeve and the cover of said outer vessel, substantially as set forth.

7. The combination of an outer water vessel having a removable cover, an inner generating vessel having a removable cover which is arranged below the cover of the outer vessel, a water supply pipe extending upwardly from the bottom of the generating vessel, a regulating valve arranged above said pipe and having its stem extending through both covers, and a sleeve surrounding said stem and connecting both covers, substantially as set forth.

Witness my hand this 10th day of December, 1904.

CHARLES L. BETTS.

Witnesses:
  OSCAR WARNER,
  H. H. FAIRFAX.